United States Patent [19]

Kohno et al.

[11] Patent Number: 5,051,852
[45] Date of Patent: Sep. 24, 1991

[54] MECHANISM FOR BALANCING A ROTARY MAGNETIC HEAD APPARATUS

[75] Inventors: Takashi Kohno; Osami Matsushita, both of Ibaraki; Takao Terayama, Ushiku; Mashanori Kohchi, Katsuta; Hideo Tomizawa, Katsuta; Kouji Satoh, Katsuta; Hiroyuki Ono, Katsuta, all of Japan

[73] Assignee: Hitachi, Ltd., Tokyo, Japan

[21] Appl. No.: 343,749

[22] Filed: Apr. 27, 1989

[30] Foreign Application Priority Data

Apr. 28, 1988 [JP] Japan ................. 63-103927

[51] Int. Cl.⁵ .................................. G11B 5/027
[52] U.S. Cl. ......................... 360/84; 360/130.22
[58] Field of Search .......................... 360/84–85, 360/130.22, 130.24, 109; 74/573 R

[56] References Cited

U.S. PATENT DOCUMENTS 4,823,218  4/1989  Ibe ......................... 360/130.24

FOREIGN PATENT DOCUMENTS 163025  10/1983  Japan .

Primary Examiner—A. J. Heinz
Attorney, Agent, or Firm—Antonelli, Terry, Stout & Kraus

[57] ABSTRACT

A rotary magnetic head apparatus for use in a VTR and producing a low level of vibration by restraining the unbalance of an overall rotary body of the magnetic head apparatus. The apparatus includes a fixed cylinder for supporting a rotary shaft via bearings, a rotary cylinder secured to one end of the rotary shaft and having magnetic heads, and a motor rotor directly coupled with the other end of the rotary shaft. At least one first balancer and at least one second balancer are respectively provided in the rotary cylinder and the rotor so as to compensate for the unbalance of the rotary body composed of the rotary cylinder, the rotary shaft, and the rotor.

9 Claims, 5 Drawing Sheets

NEUTRAL POSITION $$f = F\frac{1}{L}x$$

DISPLACED POSITION

RELATION BETWEEN VIBRATION OF CHASSIS
AND AMOUNT OF UNBALANCE

RELATION BETWEEN BLURRING OF IMAGE
AND AMOUNT OF UNBALANCE 5,051,852

MECHANISM FOR BALANCING A ROTARY MAGNETIC HEAD APPARATUS

FIELD OF THE INVENTION

The present invention relates to a rotary magnetic head apparatus.

BACKGROUND OF THE INVENTION

A conventional rotary magnetic head apparatus is arranged such that a balancer is provided around a printed circuit board mounted on a rotary body having a magnetic head so as to balance the rotary body, as in the case of a magnetic head apparatus for use in a video tape recorder (hereafter referred to as a VTR) disclosed in, for example, Japanese Utility Model Unexamined Publication No. 58-163025. In this method, no consideration is paid to the unbalance that exists on the driving motor portion or the pulley portion. Additionally, in accordance with another method which is generally adopted, each of the rotary portions formed a rotary body balanced and then the related components are assembled together.

In conjunction with the tendency toward producing a high-quality image with a VTR, the reduction of vibration of the magnetic head apparatus has been an important issue. However, in the aforementioned conventional technique, no consideration is paid to the balancing or correction of the overall magnetic head apparatus. Hence, there has been a problem in that unbalance still remains in a finished apparatus due to the unbalance on the motor portion, assembly errors during assembly and the accumulation of residual unbalance of the individual parts.

SUMMARY OF THE INVENTION

An object of the present invention is to provide a rotary magnetic head apparatus for a VTR which has a low level of vibration by offsetting the unbalance of the overall rotary body of the magnetic head apparatus.

To this object, there is provided a magnetic head apparatus comprising: a fixed cylinder for supporting a rotary shaft via a bearing; a rotary cylinder secured to one end of the rotary shaft and having magnetic heads; and a rotor of a motor directly coupled with the other end of the rotary shaft; wherein first balancer means and second balancer means are respectively provided in the rotary cylinder and the motor rotor so as to compensate for the unbalance of a rotary body composed of the rotary cylinder, the rotary shaft and the motor rotor.

Another object of the present invention is to provide a measuring device which is capable of measuring the unbalance of the overall magnetic head apparatus.

To another object, there is provided a device for measuring the unbalance of a magnetic head apparatus including a fixed cylinder for supporting a rotary shaft via a bearing, a rotary cylinder secured to one end of the rotary shaft and having a magnetic head, and a motor rotor of a motor directly coupled with the other end of the rotary shaft, the device comprising: a cylinder support for supporting the fixed cylinder; a vibration base having first magnets on the cylinder support side; a surface plate having second magnets for allowing attraction to act on the vibration base; steel balls provided between each pair of the first magnets and the second magnets; and a vibration detector for measuring the vibration of the vibration base.

Since the correction of the unbalance of a rotary body is effected for both the rotary cylinder portion and the motor rotor portion respectively after assembly of the magnetic head apparatus, it is possible to eliminate the unbalance of the overall rotary body irrespective of assembly errors and the unbalance of various components.

BRIEF DESCRIPTIONS OF THE DRAWINGS

DESCRIPTION OF PREFERRED EMBODIMENTS

Figure 1:
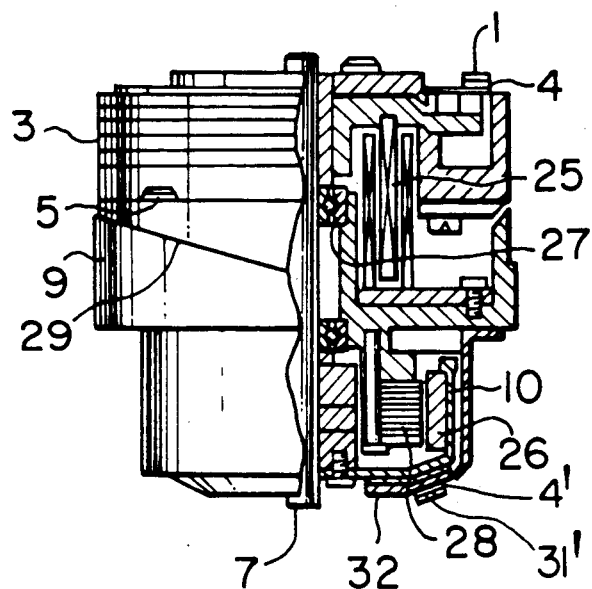
FIG. 1 is a cross-sectional view taken along the line I—I in FIG. 3 illustrating an embodiment of a magnetic head apparatus in accordance with the present invention.

Referring now to the accompanying drawings, as shown in FIG. 1, of a a magnetic head apparatus includes a fixed cylinder 9 supporting a rotary shaft 7 via bearings 27. A rotary cylinder 3 is provided above the fixed cylinder 9 and mounted two or more magnetic heads 5. The magnetic heads 5 are adapted to effect the recording and reproduction of image signals on a magnetic tape. The fixed cylinder 9 is fixed to a chassis. A lead 29 for leading a tape diagonally onto the cylinder is provided on the fixed cylinder 9 because of helical scanning which is a characteristic of a VTR, and the tape travels along the surface of this fixed cylinder 9. A motor rotor 10 is fixed to the rotary shaft 7, and a motor is formed with a main magnet 26 and a core 28 so as to drive the rotary cylinder 3. Video signals from the magnetic heads 5, mounted on the rotary cylinder 3 are transmitted in non-contact by a pair of rotary transformers 25 disposed in the rotary cylinder 3 and the fixed cylinder 9. In addition, a damper 32 is mounted on the bottom surface of the motor rotor 10 so as to restrain torsional vibration.

Figure 2:
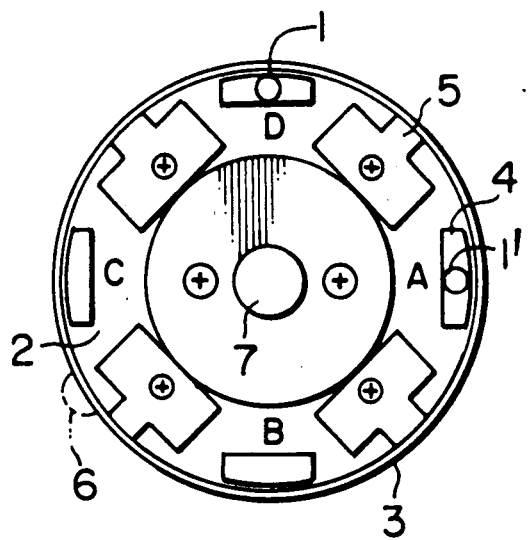
FIG. 2 is a top plan view of FIG. 1.

As shown in FIG. 2, and the rotary cylinder 3 is fixed to the rotary shaft 7 of threaded fasteners, pressure fitting or the like. The rotary shaft 7 is directly coupled with a motor rotor 10, resulting in the rotary cylinder 3 being driven at a predetermined number of revolutions. Three or more unbalance correcting surfaces 4 are mounted on the inner bottom surface or head mounting bases 2 of the rotary cylinder 3. The material of these bases varies depending on the method of correction, and if soldering correction is to be carried out, a copper-based material is selected, and if correction is to be made by an adhesive, a material which has a good affinity with that adhesive is selected. When an unbalance 6 exists in the rotary cylinder 3, two correction balancers 1 and 1' are provided at positions symmetrical about an extension of the line connecting the unbalance 6 and the center of rotation so as to offset the unbalance by mean of their resultant force.

Figure 3:
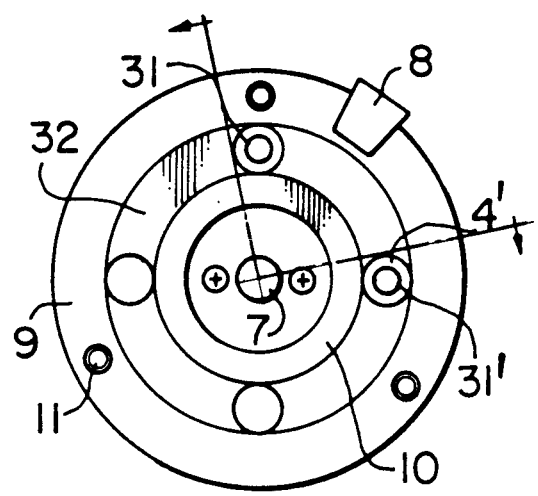
FIG. 3 is a bottom view of FIG. 1.

As shown in FIG. 3, the number of revolutions of the motor rotor 10 is detected by a rotational pulse detector 8. A damper 32 is provided on the motor rotor 10 so as to restrain the torsional vibration between the rotary cylinder 3 and the motor rotor 10. Three or more correcting surfaces 4' are provided on this damper 32. Thus, two correcting balancers 31 and 31' are provided to offset the unbalance by a method similar to that used for the rotary cylinder.

Figure 4:
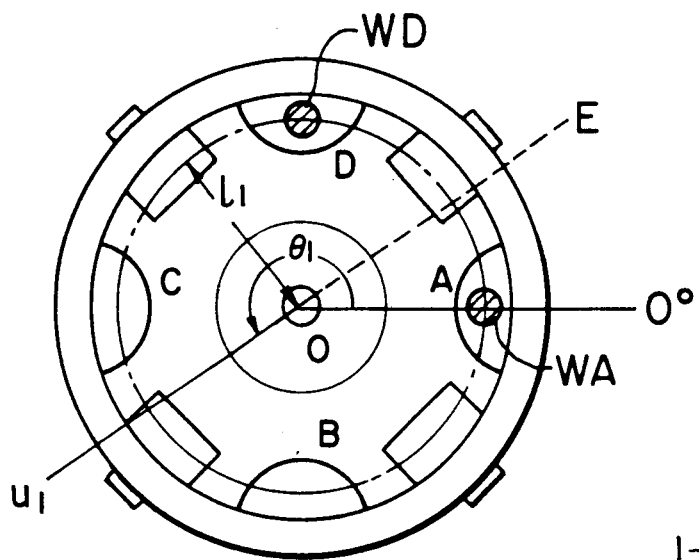
FIG. 4 is a diagram illustrating an unbalance correcting balancer in accordance with the present invention.

As shown in FIG. 4, it is assumed that the angle of an rotary cylinder portion unbalance $u_1$ is $\theta_1$, and that the amount is $W_1$ (gr-cm). As for the angle, an unbalance correcting surface A is set as 0, and the counterclockwise direction is set as positive. The restraining of the unbalance $u_1$ can be attained by providing appropriate correcting balancers $W_A$ and $W_D$ on the two correcting surfaces, i.e., the correcting surfaces A and D, which are positions as being held a position E opposite to the unbalance position $u_1$ symmetrically about center 0. If a correcting radius is assumed to be $l_1$ (cm), $W_A$ (gr) and $W_D$ (gr) are amounts that can be determined by the following formulae:

$$W_A = \frac{W_1}{l_1} \cos(\theta_1 - \pi) \quad (1)$$

$$W_D = \frac{W_1}{l_1} \sin(\theta_1 - \pi) \quad (2)$$

The unbalance of the motor rotor 10 can also be corrected by providing correcting balancers on the two correcting surfaces of the motor rotor 10 by a similar method. Thus, the unbalance of the rotary magnetic head apparatus can be reduced to nil as a whole by correcting a total of at most four locations, including two locations on the rotary cylinder 3 side and two locations on the motor rotor 10 side.

In addition, if a correcting surface is provided on a line connecting the position of the unbalance and the center of rotation 0, the unbalance can be restrained by using only each one balancer for the motor rotor side and the rotary cylinder side, respectively.

If the amount of a weight for correcting the unbalance can be varied continuously as in the case of solder or the like, that amount can be made to coincide with the amounts determined by the aforementioned formulae (1) and (2). If an already prepared weight is to be used, a weight whose amount is nearest to the amounts of correction determined by formulae (1) and (2) is selected.

In addition, the correcting balances may be provided not only the inner bottom surface of the rotary cylinder 3 but also on its inner side surface or the side surface of the motor rotor.

When the unbalance 6 is present on the rotary cylinder portion, the unbalance can be corrected by scraping or boring at positions B and C instead of providing balancers at positions A and D. A drill, a laser beam, or the like may be used for cutting. In this case, the operating efficiency can be enhanced if the material of the rotary cylinder is composed of a member which can be cut well or a member which can be melted readily by a laser beam or the like.

Figure 5:
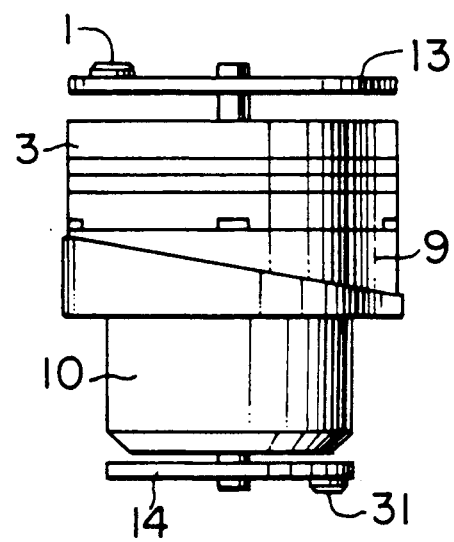
FIG. 5 is a side elevational view of the magnetic head apparatus illustrating another embodiment of the present invention.

FIG. 5 illustrates a case in which correcting plates 13, 14 are provided on the outer side of the rotary cylinder 3 or the motor rotor 10. The material of these correction plates 13, 14 is selected as to be best suited to the method of correction concerned. Since the correcting plates 13, 14 are provided with the balancers 1, 31, the unbalance can be eliminated without directly providing balancers on the rotary cylinder 3 or the motor rotor 10. It should be noted that if the correcting plates 13 and 14 are provided on the rotary cylinder 3 and the motor rotor 10 by means of a member having an appropriate resiliency, the correcting plates 13 and 14 can be provided with a damper effect. As a result, torsional vibration of the rotation body, can be restrained, so that an apparatus having an even lower level of vibration can be realized.

Consequently, it is possible to reduce the possibilities of the magnetic head and the tape sliding surface becoming distorted due to mechanical and thermal forces, which could otherwise occur when the balancer is directly mounted on the rotary cylinder 3. In addition, since the correcting surfaces are exposed to the outside, the correcting operation can be made simple.

Figure 6:
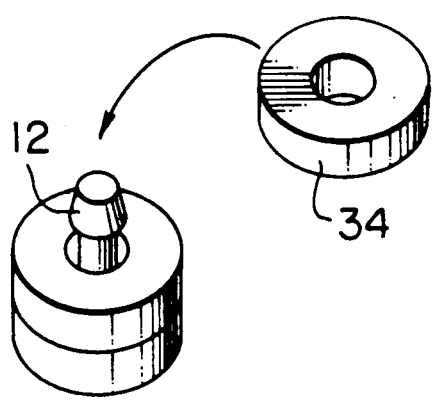
FIG. 6 is a perspective view illustrating an example of the balancer in accordance with the present invention.

FIG. 6 illustrates another example of the method of correction, in which a projection 12 having a slightly thickened end is provided instead of the correcting surface, and annular correcting weights 34 are fitted with it.

Figure 7:
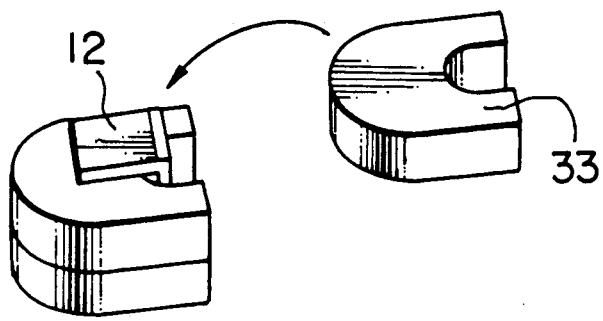
FIG. 7 is a perspective view illustrating another example of the balancer of the present invention.

FIG. 7 illustrates a case in which an L-shaped projection 12 is provided on the upper cylinder or the motor rotor, and notched correcting weights 33 are fitted with it. The arrangement is such that, as the L-shaped projection 12 is formed of a resilient material, the weights 33 which have been inserted cannot readily be removed.

In this case, a mechanical fixing method is used in the same way as in FIG. 6, so that a more positive securing method can be provided as compared with a fixing method using an adhesive.

If such a mechanical fixing method is employed, there is no need to take into consideration such problems as a decline in the reliability of the fixing strength due to a change in the environmental resistance and a change with time that are encountered in the case of an adhesive fixing, and it is thus possible to fix the correcting weights positively.

Figure 8:
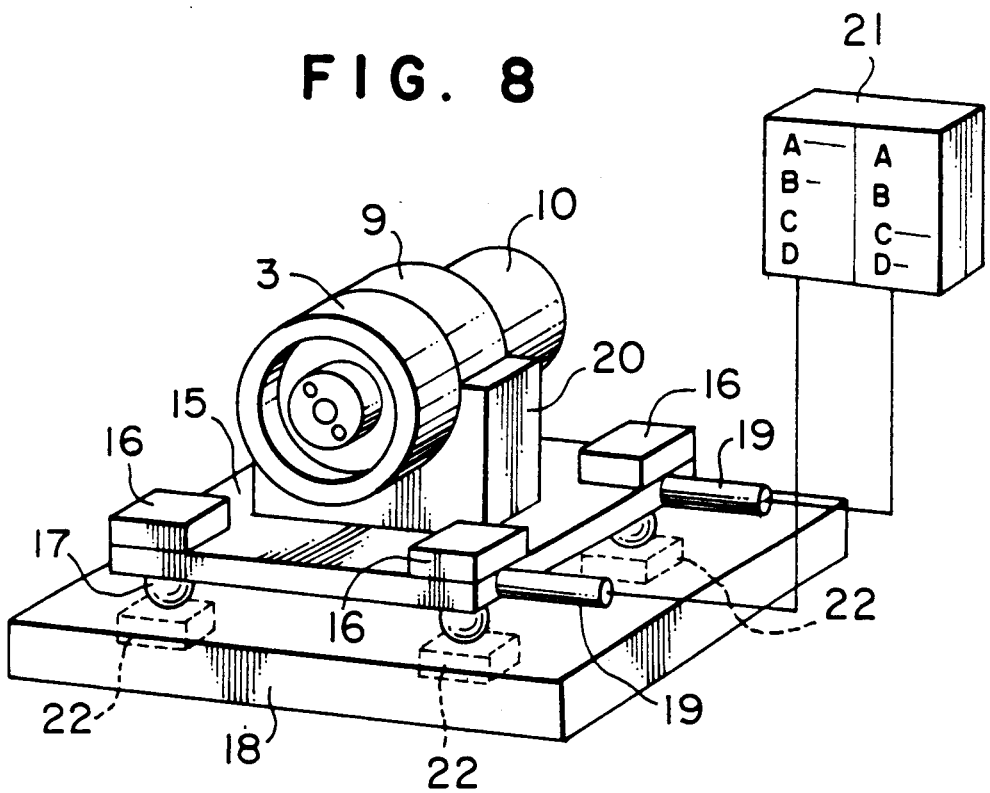
FIG. 8 is a perspective view of an unbalancer measuring device for the magnetic head apparatus in accordance with the present invention utilizing a magnetic spring.

As shown in FIG. 8, the fixed cylinder 9 of the magnetic head apparatus is secured to a cylinder support 20 of a vibration base 15. The arrangement is such that the rotary cylinder 3 and the motor rotor 10 can be rotated freely in this state if a driving current is supplied to the motor rotor 10. Magnets 16 are disposed at the four corners of the vibration base 15, and magnets 22 of the same type are embedded in a fixed plate 18 which is opposed to the vibration base 15 in such a manner that the magnets 22 will form relationships of attraction with the magnetic forces of the vibration base 15. A steel ball 17 is provided between the magnets 16 and 22 in such a manner as to be clamped by the magnets 16 and 22. A lower plate 23 may be inserted between the surface plate 18 and the steel balls 17 so as to reduce frictional resistance. Consequently, the vibration base 15 is adapted to move freely in the direction of vibration, and the weight of the vibration base 15 and the magnetic head apparatus is supported by this arrangement.

Figure 9:
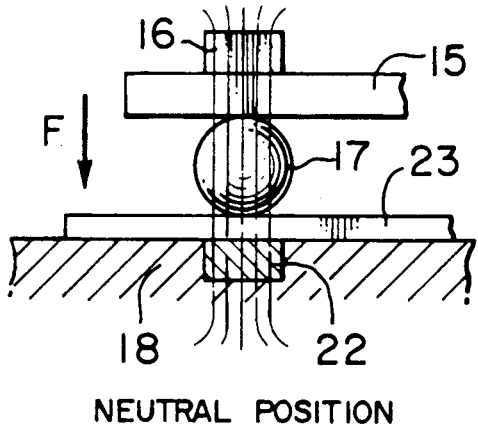
FIGS. 9 and 10 are diagrams illustrating the measurement device with the magnetic spring at a neutral position and a displaced position.

As shown in FIG. 9, the steel balls 17 cramped between the vibration base 15 and the lower plate 23 by the attraction of the magnets 16 and 22 support the vibration base 15 with adequate rigidity, and are in point contact with the vibration plate 15 and the lower plate 23. Since the rolling surfaces and the surfaces of the steel balls 17 are finished to be very smooth, the balls 17 can move freely with practically no loss due to friction within the plane parallel to the surface plate 18. In a state in which an unbalance or another force is acting on the vibration base 15, the vibration base 15 remains stationary at the position in which the centers of the magnets 16, 22 and the steel ball 17 are aligned, as shown in FIG. 9.

Figure 10:
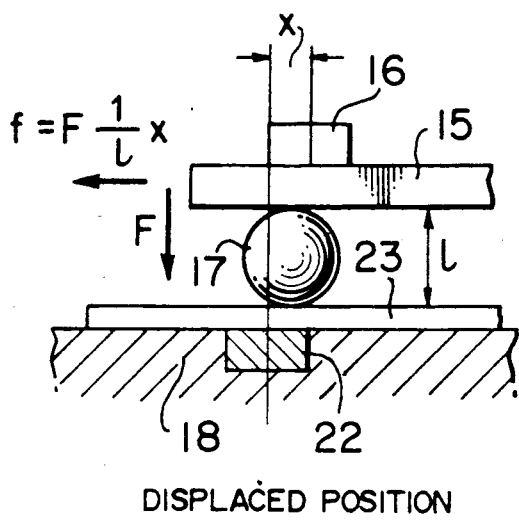

If, as shown in FIG. 10, the vibration base 15 is displaced by x from its neutral position shown in FIG. 9, a component f of the attraction F between the two magnets 16, 22 acts as a restoring force, and displays resiliency. Since the surface of the steel ball 17 and the surfaces of the vibration base 15 and the lower plate 23 opposed to the steel ball 17 are finished to be very smooth, there is substantially no friction. Accordingly, the vibration base responds sensitively even by a very small force. In addition, this magnetic spring effect remains constant in all directions within the plane, and coupling, which takes place in a leaf spring, does not occur.

Returning to FIG. 8, if a driving current is supplied to the motor rotor 10 to allow the rotary cylinder 3 to rotate, and if the number of revolutions is assumed to be $\omega$, in response to the unbalance mr of the rotary cylinder 3 oprtion and the motor rotor 10 portion, unbalanced vibration of $mr\omega^2 \cos(\omega t)$ occurs. This unbalanced vibration is measured by two non-contact sensors 19 provided on the rotary cylinder portion and the motor rotor portion, and is analyzed by an unbalance analyzer 21. The unbalance analyzer 21 calculates the amount and position of the unbalance of the magnetic head apparatus with respect to both the rotary cylinder 3 portion and the motor rotor 10 portion on the basis of sensor signals and rotational pulse signals. From the predetermined positions of unbalance described above, two locations that are suitable for correction are selected, and the amounts of correction are displayed. Upon noticing this display or upon receipt of this signal, the operator or the operating machine selects appropriate ones among the already prepared predetermined weights for correction. When cutting is to be performed, the depth of cut or a processing amount is determined in response to this amount of correction In accordance with the invention, it is possible to eliminate a decline in rigidity and the occurrence of noises due to the coupling of leaf springs, which have been the drawbacks of the conventional leaf spring-type support. Thus, it is possible to perform an excellent measurement with respect to a compact rotary body having very small degrees of unbalance, such a rotary magnetic head apparatus for a VTR.

In addition, although the operating process of unbalance correction has conventionally required three or four steps for each component, the process can be performed in one step in a assembly-completed state Furthermore, although several dozen mgr-cm of residual unbalance conventionally remains with respect to finished products, it is possible to reduce the residual unbalance to the order of several mgr-cm. In addition, although variations in unbalance in the assembled state have been large in accordance with the conventional method, but these variations can be held within the range of variations of the correcting weights in accordance with the present invention.

Figure 11:
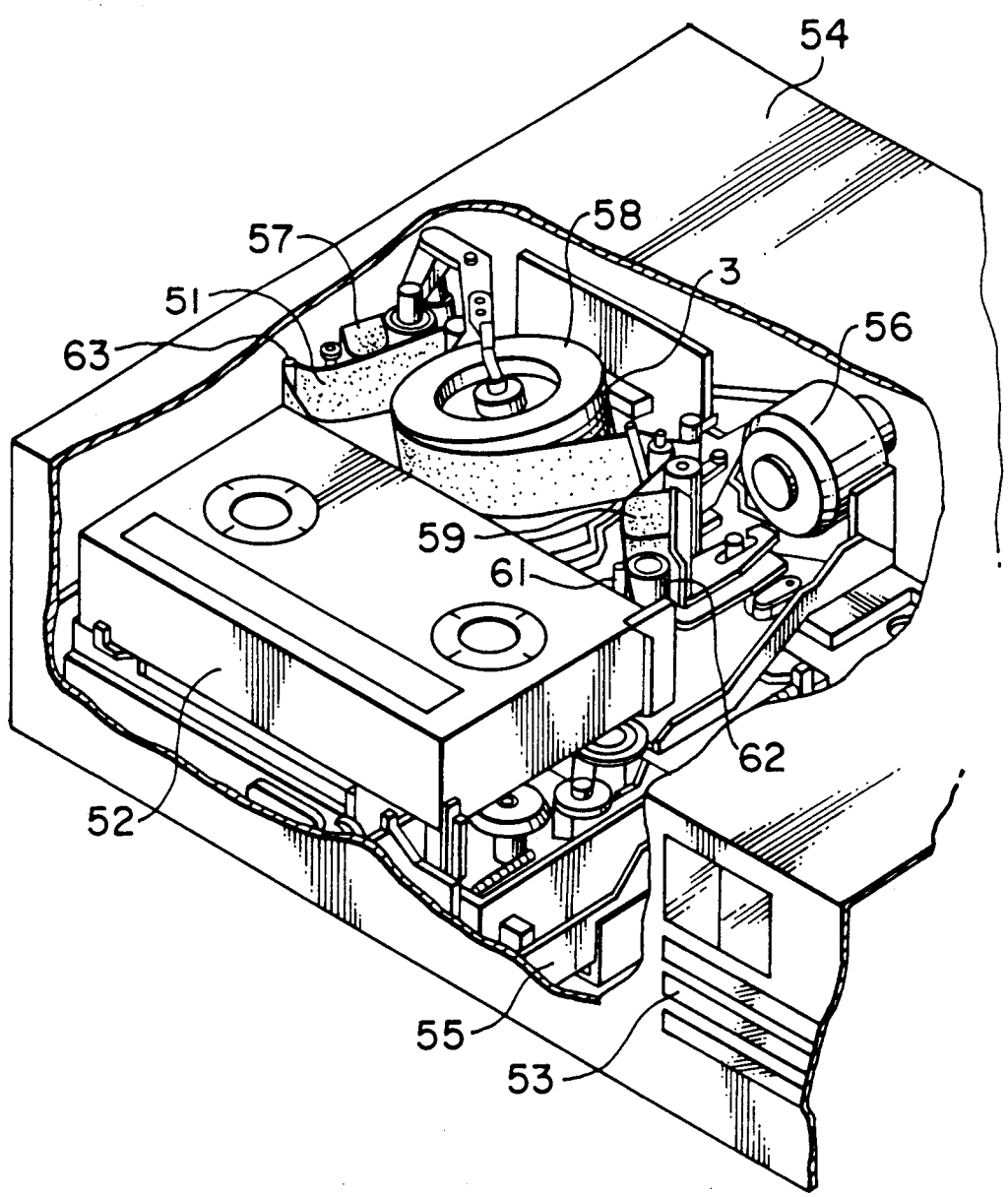
FIG. 11 is a schematic diagram of a VTR system using the magnetic head in accordance with the present invention.

In FIG. 11, a VTR cassette 52 accommodating a magnetic tape 51 is pushed in through a front panel 53, and is set in place within a chassis 55 inside a case 54. The magnetic tape 51 is paid out from the cassette by means of a loading motor 56, and is arranged to pass through a traveling system including an overall-width erasing head 57, rotating head cylinder 58, an audio head 59, a capstan 61, a pinch roller 62, etc. The magnetic tape 51 is moved from left to right as viewed in FIG. 11, and this driving force is supplied by the capstan 61. The tension of this tape traveling system is controlled by a tension pole 63 so as to remain constant, and it is so devised that stable traveling will always be effected by this arrangement, together with the servo system of the capstan 61. The rotating head cylinder 58 has a plurality of magnetic heads on an outer peripheral surface of the rotary cylinder 3 and arranged to be able to rotate by itself. Since the magnetic tape 51 is wound diagonally around this rotating head cylinder 58, if the rotating head cylinder 58 is driven while the magnetic tape 51 is made to travel, slanting magnetic recording areas (hereafter referred to as tracks) are formed on the magnetic tape 51 just as if threads are formed. Television signals for one field are recorded on one of the tracks.

One track has about 100 $\mu$m in width, about 18.5 mm in length and 173 $\mu$m in width between the adjacent tracks. To effect the recording and reproduction of video signals on such the narrow track as described, the stability of the tape traveling system and the rotational stability of the rotating head cylinder are important problems. When the rotation of the rotating head cylinder is unstable, and if the rotating head is uncapable of accurately following a recorded track during reproduction, the reproduced image deteriorates as a result.

Figure 12:
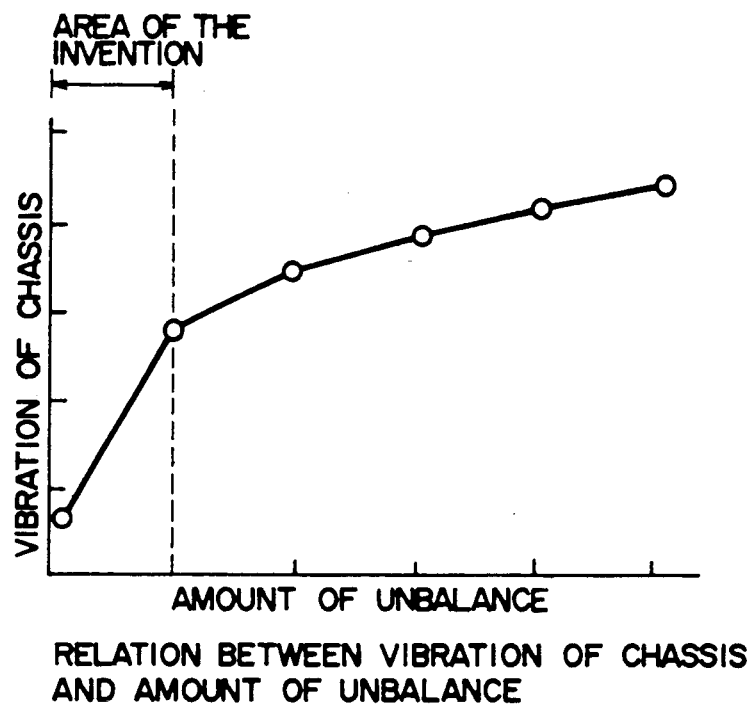
FIG. 12 is a diagram illustrating the relationship between the amount of unbalance of a rotary head cylinder and the vibration of a chassis in accordance with the present invention.
Figure 13:
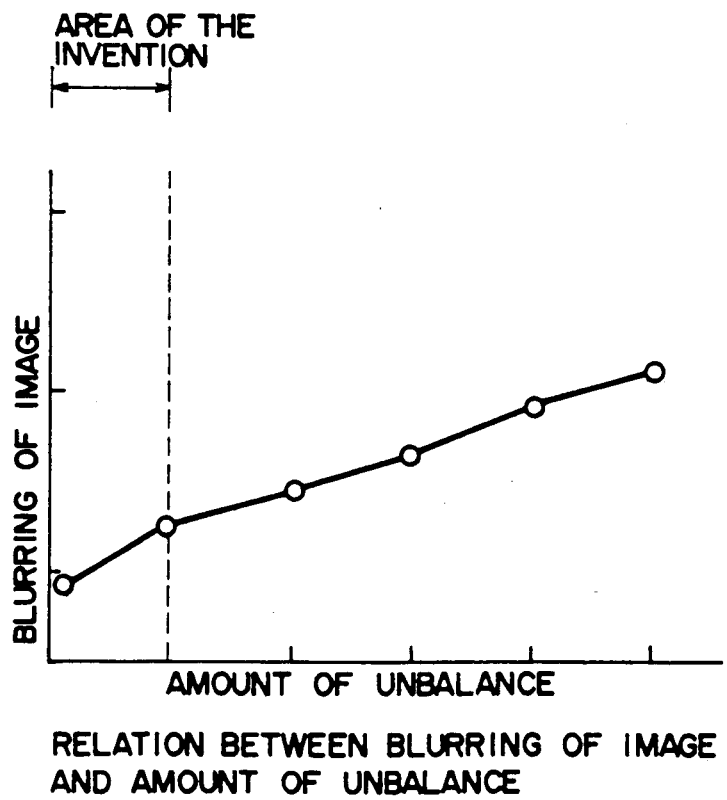
FIG. 13 is a diagram illustrating the relationship between the blurring of a VTR image and the amount of unbalance.

As is apparent from FIG. 12, the vibration of the overall chassis is substantially affected by the unbalance of the rotating head cylinder. However, if the balancer in accordance with the present invention is provided, the amount of unbalance can be minimized, with the result that the vibration of the chassis can be reduced. This vibration of the chassis leads to the vibration of the traveling system including the tension pole, the impedance roller, the capstan and the like, and results in preventing stable contact between the magnetic tape and the magnetic head. The blurring of an image shown in FIG. 13 is subject to this vibration of the chassis. In accordance with the present invention, since the vibration of the chassis can be minimized, the blurring of the image can be held down to a low level.

Thus, although the unbalance of the rotating head cylinder substantially affects the reproduced image of a VTR, it is possible to obtain a high-quality image for a VTR if the unbalance of the rotating head cylinder is corrected to a high degree of accuracy in accordance with the present invention.

In accordance with the present invention, it is possible to restrain the unbalance of the overall rotary body in a VTR-use magnetic head.

What is claimed is:

1. A magnetic head apparatus comprising:
   a fixed cylinder for supporting a rotary shaft by bearings;
   a rotary cylinder secured to one end of said rotary shaft and having magnetic heads;
   a motor rotor directly coupled with an opposite end of said rotary shaft;
   first balancer means provided in said rotary cylinder; and
   second balancer means provided in said motor rotor, whereby said first balancer means and said second balancer means compensate for an unbalance of a rotary body composed of said rotary cylinder, said rotary shaft, and said motor rotor.

2. A magnetic head apparatus according to claim 1, wherein said first balancer means includes a pair of balancer members respectively provided on two correcting surfaces located symmetrically about an extension of a line connecting a center of rotation of said rotary body and an unbalance position of the rotary cylinder.

3. A magnetic head apparatus according to claim 1, wherein said second balancer means includes a pair of balancer members respectively provided on two correcting surfaces located symmetrically about an extension of a line connecting a center of rotation of said rotary body and an unbalance position of the motor rotor.

4. A magnetic head apparatus according to claim 1, wherein said first balancer means includes one balancer member provided in said rotary cylinder and located on an extension of a line connecting a center of rotation of said rotary body and an unbalance position of the rotary cylinder.

5. A magnetic head apparatus according to claim 1, wherein said second balancer means includes one balancer member provided in said motor rotor and located on an extension of a line connecting a center of rotation of said rotary body and an unbalance position of the motor rotor.

6. A magnetic head apparatus comprising:
   a fixed cylinder for supporting a rotary shaft by bearings;
   a rotary body including a rotary cylinder having magnetic heads secured to a first end of said rotary shaft, a first correcting plate mounted on the rotary cylinder, a motor rotor directly coupled with an opposite end of said rotary shaft, and a second correcting plate mounted on the motor rotor;
   a first balancer means for compensating an unbalance of said rotary body provided in said first correcting plate; and
   a second balancer means for compensating the unbalance of said rotary body provided in said second correcting plate.

7. A magnetic head apparatus according to claim 6, wherein said second correcting plate includes a damper means for restraining torsional vibration of said rotary body.

8. A magnetic head apparatus according to claim 6, wherein said first balancer means includes one balancer member provided in said rotary cylinder and located on an extension of a line connecting a center of rotation of said rotary body and an unbalance position of the rotary cylinder.

9. A magnetic head apparatus according to claim 6, wherein said second balancer means includes one balancer member provided in said motor rotor and located on an extension of a line connecting a center of rotation of said rotary body and an unbalance position of the motor rotor.

* * * * *